March 14, 1967 W. R. NELSON 3,308,844
CONTROL APPARATUS
Filed Oct. 2, 1964 3 Sheets-Sheet 1

INVENTOR.
WAYNE R. NELSON
BY Carlsen, Carlsen & Sturm
ATTORNEYS

March 14, 1967 W. R. NELSON 3,308,844
CONTROL APPARATUS
Filed Oct. 2, 1964 3 Sheets-Sheet 2
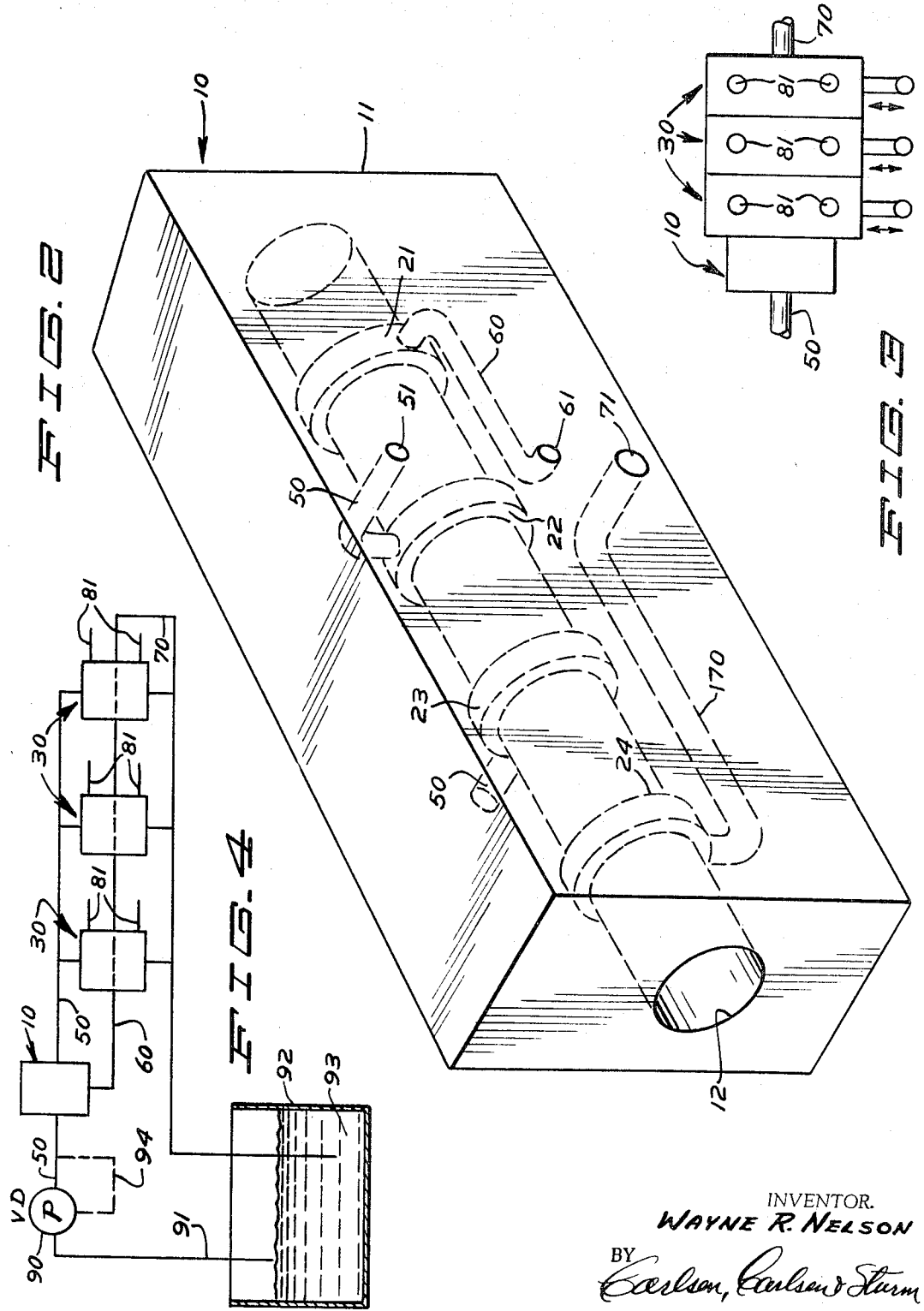
INVENTOR.
WAYNE R. NELSON
BY Carlson, Carlson & Sturm
ATTORNEYS

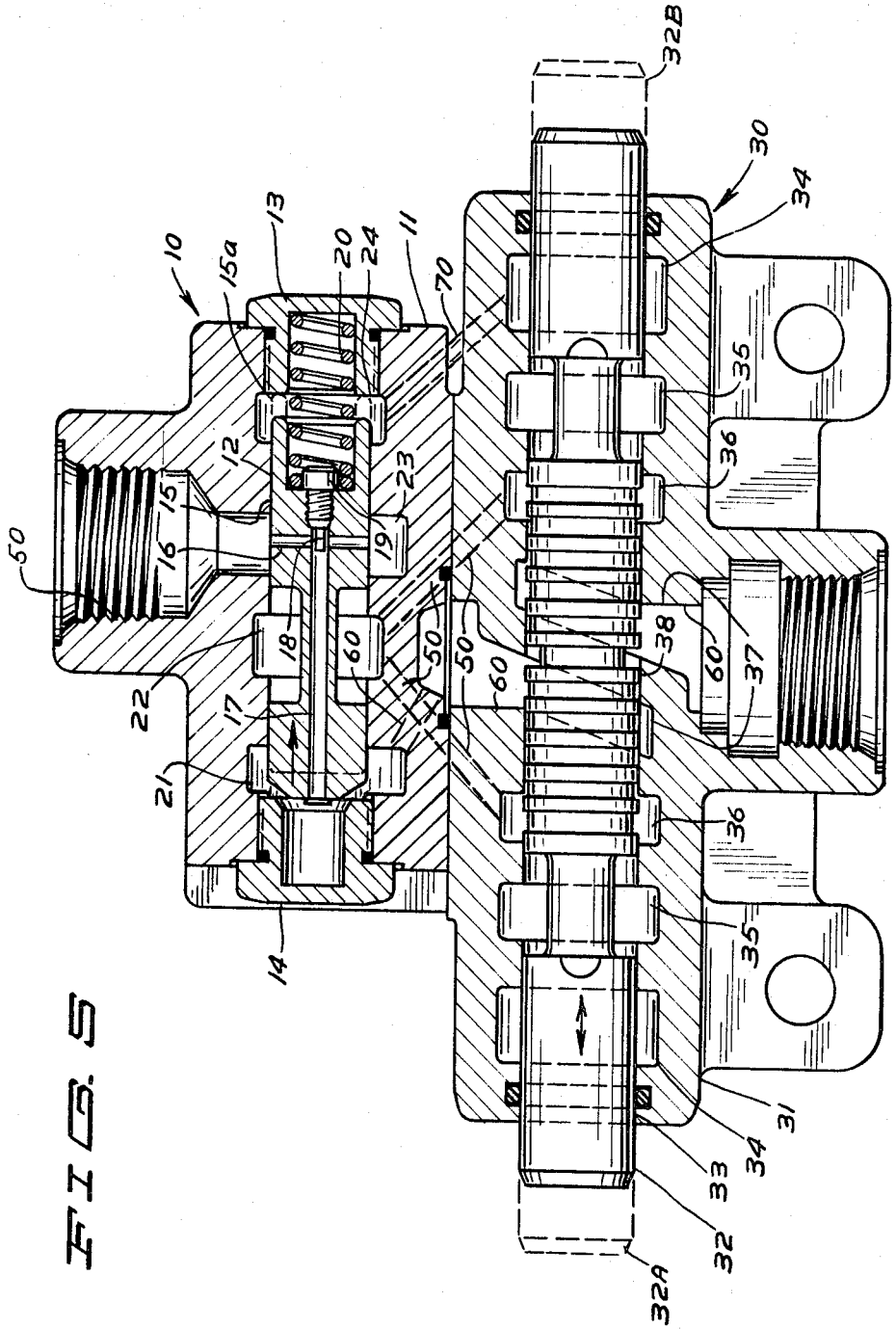

United States Patent Office 3,308,844
Patented Mar. 14, 1967

3,308,844
CONTROL APPARATUS
Wayne R. Nelson, Fridley, Minn., assignor to Gresen Manufacturing Company, Minneapolis, Minn., a corporation of Minnesota
Filed Oct. 2, 1964, Ser. No. 401,122
16 Claims. (Cl. 137—118)

This invention relates generally to hydraulic control apparatus and is more particularly directed to closed center hydraulic control systems and devices useful therein.

In the prior art with which my invention is concerned hydraulic control systems are typically comprised of a plurality of valves that are utilized to port hydraulic fluid under pressure to hydraulic motors to perform various operations in connection with apparatus upon which the hydraulic control system is utilized. In such typical prior art apparatus, a variable volume hydraulic pump is utilized to maintain a predetermined pressure in the system which is continuously applied to the valves, which may be of various types, so that when any particular valve is operated to provide hydraulic fluid to a hydraulic motor the operation will be substantially instantaneous.

It has been observed under operating conditions that the hydraulic fluid under high pressure may easily leak through typical commercially available valves and cause unintentional and undesirable operation of the hydraulic motors to which the valves are connected. For example, it has been observed that the hydraulic cylinder motors on backhoes has caused actuation of earth engaging elements of the apparatus during transportation of the vehicle upon which they are mounted from one location to another. This results in unsafe operating conditions with respect to the operator of the equipment and may result in extensive damage to the equipment.

Briefly, my invention provides hydraulic control apparatus in which the predetermined normally high output pressure of a hydraulic pump is maintained during the time in which the control valve or valves in a system are in a neutral position and such predetermined pressure is not applied to any portion of any of the control valves until such time as one or more of the control valves is displaced from its neutral position to an operative position in which it is desired to supply a quantity of hydraulic fluid to a hydraulic motor at which time the full predetermined desired pressure is applied to the control valve and normal operation is carried out.

It is therefore an object to provide improved hydraulic control apparatus.

A further object of my invention is to provide improved hydraulic control apparatus in which a hydraulic pump is operative to maintain a predetermined operating pressure and such operating pressure is effectively separated from any control valves present in a closed center hydraulic system.

A further object of my invention is to provide improved hydraulic control apparatus in which undesired operation of hydraulic motors to be controlled thereby is substantially eliminated.

A further object of my invention is to provide an improved hydraulic control apparatus which automatically responds to displacement of control valves from a neutral position to apply a predetermined hydraulic pressure for operation of hydraulic motors controlled thereby.

A still further object of my invention is to provide an improved device for use in hydraulic control apparatus for preventing the application of a predetermined high pressure output from a hydraulic pump to control valves utilized in such apparatus during the time such control valves are in neutral position.

These and other objects of my invention will become apparent from a consideration of the appended specification, claims and drawings, in which—

FIG. 2 is a perspective skeleton sketch of the body of a preferred embodiment of a novel and improved control device for use in hydraulic control apparatus;

FIG. 3 is a plan view of one embodiment of my invention;

FIG. 4 is a diagrammatic and schematic showing of a hydraulic control apparatus embodying the principles of my invention; and FIG. 5 is a plan sectional view showing the details of an assembled control valve and control device shown in FIGS. 1, 2 and 3 embodying the principles of my invention as might be utilized in the illustrated control system of FIG. 4.

Figure 1:
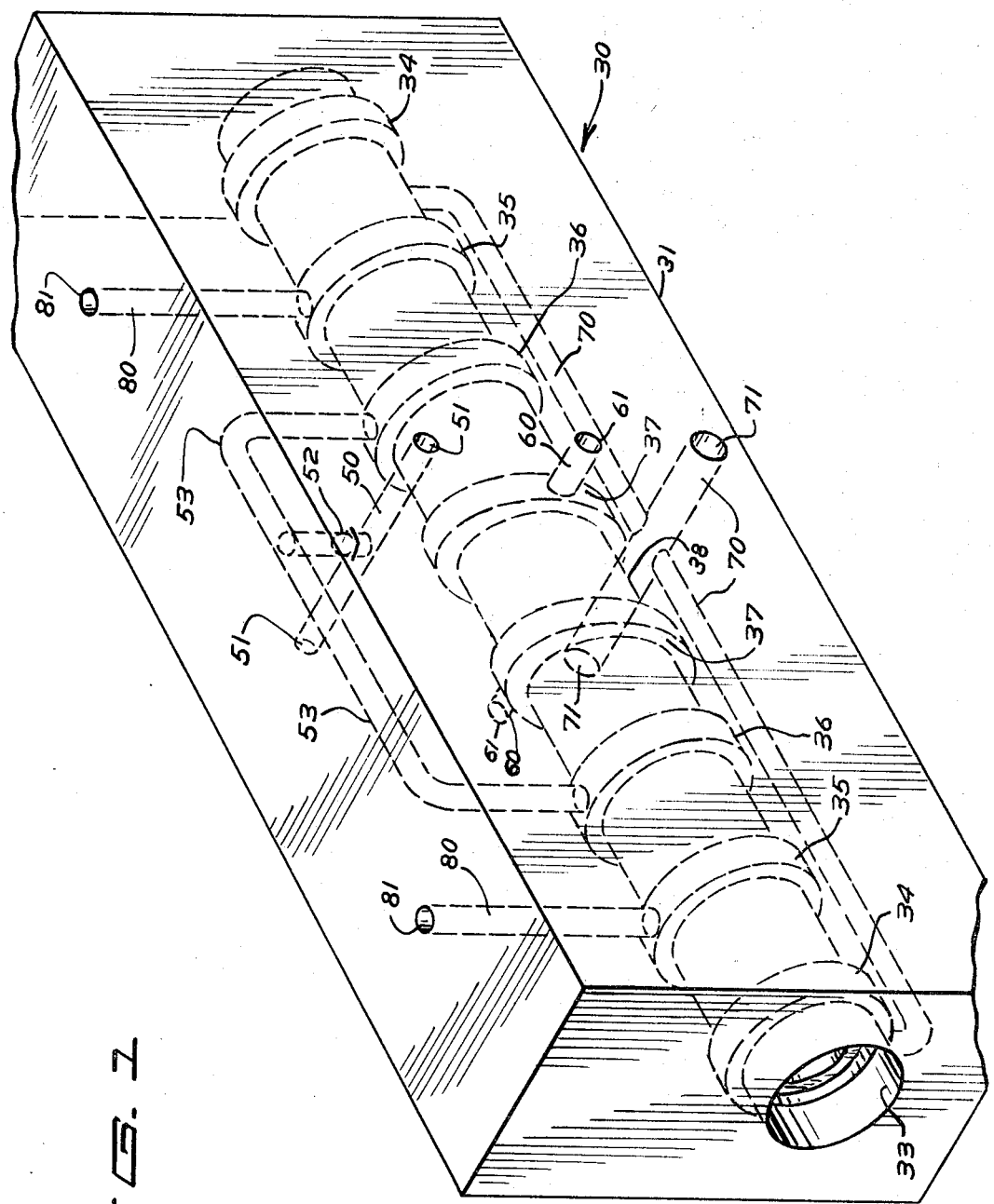
FIG. 1 is a perspective skeleton sketch of the body of a typical open center control valve.

Referring first to FIG. 1, there is shown a skeleton view of an open center type control valve in which the spool operator has been omitted for the sake of clarity. The valve is indicated generally by the reference character 30 and includes a body 31 which may conveniently be comprised of metal that is cast around a core to provide the illustrated passages adapted to coact with a suitable spool (not shown). A longitudinally extending bore 33 is shown having a pair of radially extending exhaust grooves 34; a pair of cylinder grooves 35; a pair of power grooves 36 and a pair of control grooves 37 that are inclined at an angle with respect to the longitudinal axis of bore 33 and disposed on either side of a control port 38. Exhaust groves 34 are connected to an exhaust duct 70 that extends longitudinally therefrom and transversely through body 31 to a pair of exhaust ports 71. Each of the cylinder grooves 35 is provided with a duct 80 that extends upwardly to hydraulic motor ports 81 which are adapted for connection to a hydraulic motor to provide reversible operation thereof. Power grooves 36 are connected to power duct 50 that extends transversely through body 31 through ducts 53 and a suitable check valve 52. Power duct 50 is provided with suitable ports 51 at each end thereof. One of the control grooves is shown connected to a control duct 60 having a port 61 and the other of the control grooves is also shown connected to a control duct 60 having a like port 61. The purpose of control ducts 60 and port 38 disposed intermediate control ducts 60 will become apparent from a consideration of FIG. 5 and the description of operation set forth in detail below. Further details of this type of valve are shown in my co-pending application, Ser. No. 103,762 entitled, "Spool Type Control Valve for Controlling Hydraulic Actuators," now United States Patent No. 3,174,510, issued Mar. 23, 1965.

In FIG. 2, the perspective skeleton view of the described embodiment of my control apparatus is indicated generally by the reference character 10 and is comprised of a body 11 that may be cast around a suitable core to provide a longitudinally extending bore 12 which is provided with a control groove 21; a power outlet groove 22;

a power inlet groove 23; and an exhaust groove 24. Groove 21 is in fluid communication with a control duct 60 having a port 61; power groove 22 is in fluid communication with a power duct 50 having a port 51; power groove 23 is in fluid communication with a power duct 50 have a port 51 and groove 24 is in fluid communication with an exhaust duct 70 having a port 71. It may be noted from a consideration of FIGS. 1 and 2 that ports 51, 61 and 71 on control device 10 and valve 30 are adapted to be interconnected by placing the devices in adjacent registering relationship as indicated generally on FIG. 3 in which a single control device 10 is shown operatively disposed adjacent a bank of three control valves 30 and connected to a power duct 50 and an exhaust duct 70. It should be noted at this point that the right hand control valve 30, as indicated on FIG. 3, will be slightly modified from that shown on FIG. 1 and in any case the control valve that is most remote from the pump and control device 10 will be provided with suitable duct means interconnecting ports 61 and 71 on control duct 60 and exhaust duct 70 and a suitable plug or closure will be applied to port 51 on control duct 50.

In the hydraulic control apparatus illustrated diagrammatically and schematically in FIG. 4, a fluid reservoir 92, containing a suitable quantity of fluid 93, is shown connected to a variable delivery hydraulic pump 90 through a suitable inlet duct 91. The output of pump 90 is connected to a power duct 50. Suitable control feedback means 94 are provided to control the volume of fluid at the outlet of pump 90 as supplied to control duct 50. Control device 10 is connected to power duct 50. The output of control device 10 is in turn connected to a power duct 50 that is also connected to inlet ports 51 of each of a plurality of control valves 30 and a further output of control device 10, indicated as control duct 60, is also connected through control ducts 60 in each of the control valves 30 to an exhaust duct 70. Each of the control valve 30 is provided with a pair of outlet ports 81 adapted to connection to suitable reversible hydraulic motors (not shown).

In the sectional plan view of FIG. 5, control device 10 is shown as having a spool, or piston 15, in operative relationship with the body shown in the perspective skeleton view of FIG. 2 and a spool, or piston 32, in operative relaship with the body shown in the perspective skeleton view of FIG. 1. In FIG. 5 control device 10 is shown having a body 11, a longitudinally extending bore 12 having a control groove 21, a power groove 22, a further power groove 23 and an exhaust groove 24. A spool member 15 having a radial duct 16 and a longitudinal duct 17 interconnected by an orifice 18, that may be adjusted by adjusting screw 19, is slidably disposed in operatively relationship to bore 12. A pair of end caps 13 and 14 are mounted on either end of bore 12 and a spring biasing member 20 is disposed intermediate end cap 13 and spool 15 to maintain spool 15 in the position shown in the drawing in solid outline. As will become apparent from the description set forth below, spool 15 may be displaced to a position indicated by reference character 15A to provide the desired operation of the control apparatus. It may also be noted that groove 22 is connected to power ducts 50 which are shown in dotted outline in diagrammatic and schematic form to indicate that fluid may be supplied from power groove 22 on control device 10 to each of the power grooves 36 on control valve 30. It may also be noted that control groove 21 is in fluid communication with control duct 60 that is adapted to provide fluid communication with the corresponding control duct 60 on control valve 30 so as to provide fluid communciation with a corresponding control duct 60 on control valve 30 so as to provide fluid communication with the left hand control groove 37 thereon. It may also be noted that exhaust groove 24 is shown diagrammatically and schematically as being in fluid communication through exhaust duct 70 in control device 10 to exhaust duct 70 in control valve 30. As noted above, spool 15 is normally biased, through the force exerted by compression spring 20, toward the left end of control device 10. Fluid communication may exist through control device 10 in a circuit proceeding from power inlet duct 50 at the top of FIG. 5, through radial duct 16, orifice 18 and longitudinal duct 17 in spool 15, to the left end of control device 10 and into control groove 21 and thence to control duct 60 which, as noted above in connection with FIGS. 1 and 2, is adapted to connect through coacting registering ports 61 to the open center control portion of control valve 30.

Also shown in plan sectional view on FIG. 5 is control valve 30 having a body 31, a suitably configured spool member 32 disposed in longitudinal bore 33 and a pair of exhaust grooves 34, a pair of cylinder, or motor grooves 35, a pair of power grooves 36 and a pair of inclined control grooves 37 which are symemtrically disposed on either side of a control port 38. Spool member 32 is suitably configured to provide the desired power and exhaust duct connections to grooves 35 and to control the flow of fluid intermediate control ducts 60 connected to control grooves 37 which are disopsed on opposite ends of control port 38.

*Operation*

In operation it will first be assumed that the control apparatus shown in FIG. 4, as might be comprised of the bank of control valves 30 and a control device 10 indicated in FIG. 3 and as illustratively shown in FIG. 5 as embodying one control device 10 and one control valve 30, is in the neutral position as shown in FIG. 5. It may also be noted at this point that the characteristics of pump 90 are such as to provide a variable delivery in volume of fluid while maintaining a substantially constant pressure at the outlet thereof. Under such conditions of operation, control device 10 is operative in the position shown in FIG. 5 and each of the plurality of the control valves 30 is in a neutral position as also shown on FIG. 5. The conditions described above regarding the fluid duct communication intermediate control duct port 61 and exhaust port 71 on the right hand valve 30 (FIG. 3) are assumed to have been provided even though not shown on the drawings.

Under such conditions, it should be noted that spool 15 in control device 10 is positioned so as to prevent the flow of hydraulic fluid intermediate power grooves 22 and 23 thereon whereby pump 90 is effectively disconnected from power ducts 50 in the several control valves 30. During this condition of operation, that is with each of the control valves 30 in a neutral position, it may be seen that it is possible for fluid to flow from groove 21 in control device 10 completely through control ducts 60 and the several control ports 38 in the several valves 30, to exhaust duct 71. The source of fluid flowing through control duct 60 is from the outlet of pump 90 through power duct 50 on control device 10, radial duct 16, orifice 18, longitudinal duct 17 and control groove 21 in control device 10. Through this arrangement, variable delivery pump 90 may maintain the predetermined desired pressure at its outlet with a substantially reduced flow as determined by the size of adjustable orifice 18 as determined by the position of adjusting screw 19 disposed in operative relationship thereto on spool 15 in control device 10. It may be noted that the size of orifice 18 is substantially less than the size of duct 17 for conveying hydraulic fluid from orifice 18 to exhaust duct 70.

At such time as it is desired to operate a reversible hydraulic motor connected to one or more of the plurality of control valves 30, the spool 32 is displaced to the position indicated by reference character 32A or 32B, depending upon the direction of operation desired for the hydraulic motor connected to the particular valve under consideration. At such time, the central portion of spool member 32 is operative to close port 38 which in turn prevents the continued flow of fluid through the circuit of control duct 60 to exhaust duct 70. The increase in pressure applied to the left end of spool 15 on control device 10 causes it to move to the position indicated by reference character 15A and the dotted outline indicated on FIG. 5. When spool 15 reaches this position, it may be seen that power groove 22 and power groove 23 are placed in fluid communication and variable delivery pump 90 will be operative to maintain the desired predetermined hydraulic pressure and the volume of hydraulic fluid will automatically be increased in accordance with the normal characteristics of such a pump.

At this time, the full pressure and necessary volume from pump 90 will be applied to power ducts 50 on each of the control valves and the associated check valve members 52 will be operative to allow the flow of hydraulic fluid at the predetermined desired pressure to the spools of the particular valve or valves that have been displaced from their neutral positions by an operator to provide the desired flow of hydraulic fluid to each of the associated reversible hydraulic motors in a manner familiar to those skilled in the art with which my invention is concerned.

It may thus be seen that I have provided a control system in which undesired operation of controlled elements, or hydraulic motors, is prevented by effectively disconnecting the output of an hydraulic pump from the control valve in the system until such time as the control valves are displaced from a neutral condition and under the control of an operator, the system is rendered operative to cause actuation, or energization of one or more of a plurality of reversible hydraulic motors.

While I have shown a preferred embodiment of my invention as comprising control apparatus in which open center type control valves constructed in accordance with the principles of the invention disclosed, described and claimed in my co-pending application are utilized, it may now be apparent to those skilled in the art that the flow of hydraulic fluid from control duct 60 in controlled device 10 may be conveniently controlled by other means that are operative in accordance with displacement of one or more of each of a plurality of control valves utilized in a control system. It may thus be apparent to those skilled in the art that control device 10 may be placed in series with one or more control valves intermediate the control valves and the outlet of a variable delivery pump of the class above described and the output of the pump may be controlled in accordance with actuation of one or more of the control valves between conditions of full flow or a nominal flow while maintaining fluid communication through a closed center system without having the undesirable leakage and resultant inadvertent actuation or operation of the controlled hydraulic devices present in a control system.

It is understood that suitable modifications may be made in the structure as disclosed, provided such modifications come within the spirit and scope of the appended claims. Having now therefore fully illustrated and described my invention, what I claim to be new and desire to protect by Letters Patent is:

1. In combination with hydraulic control apparatus including at least one open center valve and a variable delivery pump, control valve means comprising in combination: a valve body including an axially extending bore and at least three axially displaced, radially extending grooves, one of said grooves being connected to an inlet port and one of said grooves being connected to an outlet port; a valve member reciprocably journaled in said bore, said valve member having means operative in a first position to provide fluid communication intermediate said inlet and outlet ports and in a second position to provide fluid communication intermediate said inlet port through the other of said grooves to at least one open center valve; means biasing said valve member toward said second position; and means operative to selectively drive said valve member to said first position.

2. The apparatus of claim 1 in which the valve member includes means for restricting the flow of fluid therethrough in said second position.

3. Flow controlling apparatus for use in a closed center hydraulic control system embodying a variable delivery pump comprising in combination: a valve body having a bore including an inlet groove, an outlet groove and a control groove, power duct means and control duct means; a valve spool disposed in said bore, said spool having means adapted to interconnect said inlet and outlet grooves in a first position and having further means to interconnect said inlet groove and said control groove in a second position; means for selectively driving said valve spool to said first position; and means biasing said spool to said second position.

4. The apparatus of claim 3 in which the further means includes a flow restricting means intermediate the inlet groove and the control groove when in said second position.

5. The apparatus of claim 4 in which the valve spool is responsive to an increase in pressure in the control groove to move to said first position.

6. The apparatus of claim 4 in which the flow restricting means is an orifice.

7. The apparatus of claim 6 in which the orifice is adjustable.

8. A hydraulic control system comprising in combination: a variable volume source of hydraulic fluid; at least one valve means adapted to control the flow of fluid to hydraulic output utilization devices; and flow controlling means connecting said valve means to said source of hydraulic fluid, said flow controlling means having further means operative in a first position allowing full flow of fluid flow therethrough and in a second position allowing less than full flow therethrough.

9. The apparatus of claim 8 in which the source of hydraulic fluid is a variable delivery pump having the characteristic of providing a variable volume of hydraulic fluid at a substantially constant pressure.

10. The apparatus of claim 9 in which the flow controlling means is normally in the second position and is responsive to operation of the valve to supply a full flow of fluid thereto.

11. The apparatus of claim 9 in which the valve is an open center valve and the open center portion of the valve is connected to the flow controlling means when the flow controlling means is in the second position.

12. The apparatus of claim 11 in which the flow of fluid through the flow controlling means in said second position includes an orifice.

13. The apparatus of claim 8 and flow restricting means connected to said flow controlling means and responsive to actuation of the valve means to provide operation to the flow controlling means in said first position.

14. The apparatus of claim 8 in which the flow controlling means includes first and second output ports, said first port being connected to the valve when the flow controlling means is in the first position.

15. The apparatus of claim 14 in which the second port is connected to flow restricting means responsive to actuation of the valve means to restrict the flow of fluid through the second port whereby said flow controlling means is operative in the first position to provide fluid to the valve through the first port.

16. A hydraulic control system, comprising in combination: a fluid reservoir, a pressure responsive variable volume pump, at least one open center valve means having a flow transmitting neutral position and being adapted for connection to a fluid utilization means, duct means intermediate said reservoir and said pump, flow control means, including duct means, connected intermediate said pump and said valve means, said flow control means including means responsive to a neutral position of said valve means to restrict the flow of fluid to said valve means and to provide an unrestricted flow of fluid when said valve means is in a non-flow transmitting position, and duct means connecting said valve means to said fluid reservoir.

References Cited by the Examiner
UNITED STATES PATENTS

| | | | |
|---|---|---|---|
| 2,247,141 | 6/1941 | Twyman | 91—414 |
| 2,526,709 | 10/1950 | Tait | 137—625.63 |
| 2,702,529 | 2/1955 | Doerfner | 137—625.69 |
| 2,790,427 | 4/1957 | Carlson | 137—625.61 |
| 2,964,057 | 12/1960 | Dyson | 137—625.6 |
| 2,971,536 | 2/1961 | Junck et al. | 251—282 |
| 3,185,175 | 5/1965 | Plate | 137—596.12 |

M. CARY NELSON, *Primary Examiner.*

H. KLINKSIEK, *Assistant Examiner.*